United States Patent
Boissier et al.

[15] 3,674,841
[45] July 4, 1972

[54] 10,11-DIHYDRO-,9,10-DIHYDRO-10,10-DIMETHYL-5-OR 9-[3-AMINO-2-OXO-OR-HYDROXY-PROPYLIDENE] -5H-DIBENZO[A,D] CYCLOHEPTENES AND-ANTHRACENES

[72] Inventors: Jacques Robert Boissier, Paris; Roger Ratouis, Saint-Cloud, both of France

[73] Assignee: Societe Anonymedite: Roussel-UCLAF, Paris, France

[22] Filed: March 3, 1969

[21] Appl. No.: 804,024

[52] U.S. Cl. ............260/501.12, 260/501.18, 260/570.5 C, 260/570.6, 260/570.8 TC, 260/583 H, 424/330
[51] Int. Cl. .....................................C07c 91/02, C07c 97/10
[58] Field of Search...............260/570.8 TC, 570.5 C, 570.6, 260/501.12, 501.18

[56] References Cited

UNITED STATES PATENTS

| | | | |
|---|---|---|---|
| 3,202,686 | 8/1965 | Hughes et al. | 260/570.5 X |
| 3,281,469 | 10/1966 | Peters et al. | 260/570.8 |
| 3,215,739 | 11/1965 | Holm | 260/570.8 |

OTHER PUBLICATIONS

Royals, " Advanced Organic Chemistry," pages 529– 530 (1954)

Wagner et al., " Synthetic Organic Chemistry," pages 149–150 and 340– 341 (1963) Hines; Robert V.

*Primary Examiner*—Robert V. Hines Hines
*Attorney*—Davis, Hoxie, Faithfull & Hapgood

[57] ABSTRACT

The products are new tricyclic amino compounds and acid addition salts thereof, said tricyclic amino compounds corresponding to the general formula:

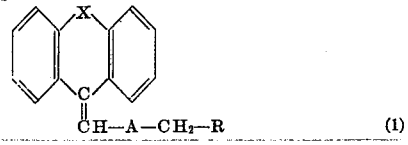

where X represents one of the following divalent hydrocarbon radicals:

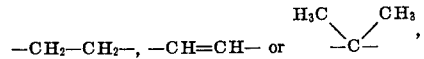

A represents a carbonyl (CO) or a hydroxymethylene (CHOH) group and R represents a monoalkylamino or a dialkylamino radical.

They are very useful substances for human therapeutics, namely as antidepressants and antianxiety agents.

The process for preparing compounds of formula (1) and their salts is disclosed.

5 Claims, No Drawings

10,11-DIHYDRO-,9,10-DIHYDRO-10,10-DIMETHYL-5-OR 9-[3-AMINO-2-OXO -OR-HYDROXY-PROPYLIDENE] -5H-DIBENZO[A,D] CYCLOHEPTENES AND-ANTHRACENES

The present invention relates to new tricyclic amino compounds, to their acid addition salts and to the process for preparation thereof.

The products according to the invention have proved to be very useful in human therapeutic, namely as antidepressants and antianxiety agents.

The new tricyclic amino compounds, according to the invention, are represented by the general formula:

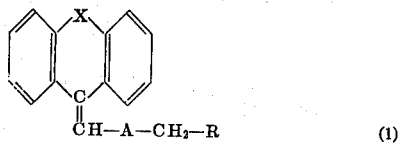

where X represents one of the following divalent hydrocarbon radicals:

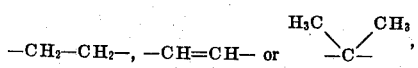

A represents a carbonyl (CO) or a hydroxymethylene (CHOH) group and R represents a monoalkylamino or a dialkylamino radical.

In the monoalkylamino or dialkylamino expressions above cited, the term alkyl represents an alkyl radical containing from one to four carbon atoms.

According to the invention, tricyclic amino compounds of formula (1) are produced by isomerizing, with an acid, an acetylenic aminoalcohol compound of general formula:

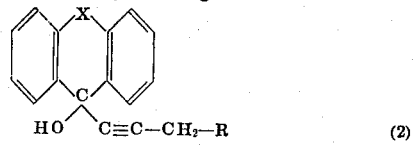

where X and R have the meanings defined above, or a salt of the said aminoalcohol, then by neutralizing the reaction medium with an alkaline agent, then by isolating the obtained compound of formula (1), where A represents a carbonyl group (CO), and eventually by reducing said compound of formula (1) by gaseous hydrogen in a neutral medium and in presence of Raney nickel catalyst or by an alkali-metal borohydride, and by isolating from the reaction medium the obtained compound of formula (1), where A represents a hydroxymethylene group (CHOH).

The herein above described reactions can be schematized as follows:

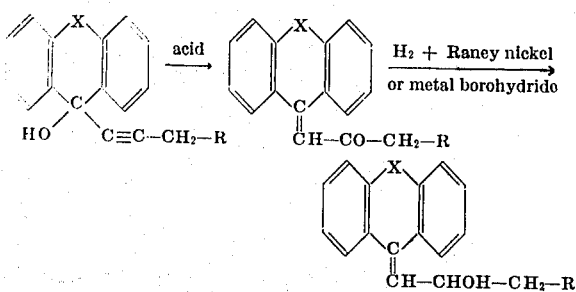

The preferred conditions for carrying out the process are as follows:

the acetylenic aminoalcohol compound of formula (2) or one of its salts, obtained from an organic or inorganic acid, is added to an alcoholic or an aqueous solution of an organic or inorganic acid; the alcohol may be, for instance, methanol or ethanol; the obtained mixture is maintained over a temperature range of about 20° C. to about the boiling point of the reaction mixture and, at the completion of the reaction, the mixture is basified, for instance with a sodium hydroxide solution, and the resulting compound of formula (1), in which A represents a carbonyl group, is extracted by usual means. The above mentioned inorganic or organic acids may be selected advantageously from hydrochloric, sulphuric, phosphoric, formic or acetic acids.

The reduction of compound of formula (1), where A represents a carbonyl group (CO), by gaseous hydrogen in a neutral medium in the presence of Raney nickel catalyst, is carried out preferentially by stirring, under an atmosphere of hydrogen at room temperature and at atmospheric pressure, a solution of a compound of formula (1) to be reduced within a lower alkanol, such as methanol or ethanol, said solution containing a suspension of Raney nickel in the range of 5 to 20 percent in weight in respect to the weight of product to be reduced; when the reduction is complete, the catalyst is separated by filtration and the desired compound is isolated from the filtrate by usual means, for instance by concentration.

The reduction of compound of formula (1), where A represents a carbonyl group, realized by the aid of an alkali-metal borohydride, such as sodium, potassium or lithium borohydride, is carried out preferentially by adding fractionally the alkali-metal borohydride to a solution of a compound of formula (1) to be reduced in a lower alkanol, such as methanol or ethanol, then by boiling under reflux the reaction mixture and, when the reaction is complete, by adding water and by isolating, by usual means, such as extraction and concentration, the reduced compound of formula (1). The alkali-metal borohydride advantageously used is sodium borohydride. The reduction by an alkali-metal borohydride can also be carried out on a salt of a compound of formula (1), where A represents a carbonyl group (CO).

Compounds of the above mentioned general formula (1) are basically active substances and, according to the invention, their acid addition salts can be prepared by reacting corresponding organic or inorganic acids with these compounds of formula (1), performing advantageously the reaction within a solvent. The preferred solvents are anhydrous solvents such as benzene, ethyl ether, ethanol and acetone. Salts can be prepared without isolating the compound of formula (1) from the reaction mixture wherein it was obtained.

According to an alternative method of the process of the invention, it is possible to obtain salts of compounds of formula (1), where A represents a carbonyl group (CO), by reacting an acetylenic aminoalcohol of formula C2) with an acid and isolating directly the acid salt of the compound of formula (1), where A represents a carbonyl group (CO).

The acetylenic aminoalcohol compounds of formula (2), that are used as starting materials in the foregoing procedure, can be prepared by reacting the metal salt of an acetylenic compound of general formula:

$$Me - C \equiv C - CH_2 - R \qquad (3)$$

where R has the meanings defined above and Me means an alkali-metal atom such as sodium, or lithium, with a ketone of general formula:

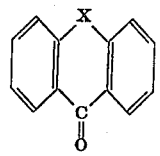

(4)

where X has the meanings defined above, then by hydrolyzing the obtained product by addition of water.

The reaction of condensation is carried out preferentially within an anhydrous aromatic hydrocarbon and performed at the boiling temperature of the reaction medium. After adding water, alcohol of formula (2) is isolated from the reaction mixture by usual means.

The metal salt of formula (3) can be obtained either by condensing, within liquid ammonia, an acetylenic compound of formula H — C ≡ C — CH₂ — R, where R has the meanings already defined, with a suitable alkaline agent, such as metalic sodium, sodium amide or lithium amide, or by reacting, in situ, an ethylenic compound of formula:

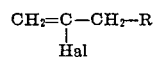

$$CH_2=C-CH_2-R \quad (5)$$
$$\quad\quad |$$
$$\quad Hal$$

where R has the meanings defined above and Hal means a chlorine or bromine atom, with twice the equivalent quantity of sodium or lithium amide, performing the reaction within liquid ammonia.

Tricyclic amino compounds of formula (1) and their salts are very useful substances for human therapeutic, namely because of their remarkable antidepressant and antianxiety activity.

The activity of the following compounds was studied in greater detail:

10,11-Dihydro-5-[3-(dimethylamino)-2-oxo propylidene]-5H-dibenzo[a,d]cycloheptene hydrochloride (hereinafter referred as 2203–01)

9,10 10-Dihydro-10,10-dimethyl-9-[3-(dimethylamino)-2-oxo propy-lidene]anthracene hydrochloride (hereinafter referred as 2203–02)

10,11-Dihydro-5-[3-(dimethylamino)-2-hydroxy propylidene]-5H-dibenzo[a,d]cycloheptene hydrochloride (hereinafter referred as 2203–03)

10,11-Dihydro-5-[3-(methylamino)-2-oxo propylidene]-5H-di-benzo[a,d]cycloheptene hydrochloride (hereinafter referred as 2203–07)

10,11-Dihydro-5-[3-(methylamino)-2-hydroxy propylidene]-5H-dibenzo[a,d]cycloheptene hydrochloride (hereinafter referred as 2203–08)

5-[3-(Dimethylamino)-2-oxo propylidene]-5H-dibenzo[a,d]cycloheptene hydrochloride (hereinafter referred as 2203–09).

Pharmacological tests and their results were as follows:

1. Antagonism against ptosis induced in mice by injection of 0.5 mg/kg of reserpine was studied, tested compounds and reserpine being administered by intraperitoneal route simultaneously. Minimal effective doses of these compounds are indicated in the table below.

2. Antagonism of the 6 compounds against bradychardia, induced in rats by intraperitoneal injection of 5 mg of reserpine, was tested according to Halliwell et al.'s method (Brit. J. Pharmacol. 1964, 23, 332), this antagonism occured from an intraperitoneal injection of 20 mg/kg. Compounds 2203–02 and 2203–08 showed the most activity.

3. Protection from electrochoc effects was evaluated on mice stereotyped 30 minutes after intraperitoneal administration of the compounds. Minimal effective doses are reported in the table below.

4. Potentiating effects of these compounds towards apomorphine were tested according to Ther and Schramm's method (Arch.inter. pharmacodyn. 1962, 138, 302). Compounds by intraperitoneal route and 10 mg/kg of apomorphine hydrochloride by subcutaneous route were injected simultaneously. A visible increase of gnawing of animals was watched, that is a characteristical response of antidepressant activity according to Ther (Method in drug evaluation - Mantegazza and F. Piccini - Ed. North Holland Publishing Company Amsterdam 1966, p. 201/2). The terminal effective doses of the compounds are represented in the table below.

5. Potentiation towards Sterotyped behavior induced in rats by intraperitoneal administration of 5 mg/kg of d-amphetamine was studied according to Halliwell et al.'s technic (Brit. J. Pharmacol. 1964, 23, 330). d-Amphetamine was injected to animals 1 hour after the tested compound. A distinct increase of the stereotyped movements was observed from the doses indicated in the table.

6. Potentiating activity of the compounds towards a dose of 25 mg/kg of sodium pentobarbital was studied on mice by injecting this substance intraperitoneously 30 minutes after the compounds. The effective threshold doses are reported in the table below.

7. Lethal doses 50 (LD 50) of the compounds administered by intraperitoneal route on mice were evaluated. Death rate was noticed 48 hours after the injection and LD 50 doses were calculated according to Behrens and Karber's method.

TABLE

| products | Minimal effective doses (mg/kg) | | | | | LD 50 mg/kg |
|---|---|---|---|---|---|---|
| | re-serpine | electro-choc | apo-morphine | d-am-pheta-mine | sodium pento-barbital | |
| 2203–01 TD | 5 | 20 | 5 | <10 | <20 | 71 |
| 2203–02 | | 20 | 20 | 20 | 20 | 163 |
| 2203–03 | 20 | <20 | 10 | 20 | 20 | 49 |
| 2203–07 | 5 | 20 | >20 | 10 | <20 | 74 |
| 2203–08 | 5 | 30 | 10 | 10 | <20 | 56 |
| 2203–09 | 5 | 30 | 5 | 10 | >20 | |

Owing to their very interesting pharmacological activities, compounds of formula (1) and their acid addition salts are very useful medicines for human therapeutic, especially as antidepressants and antianxiety agents. They can thereby be employed in treatment of depressive illness, of tempered disorders and of neurovegetative disturbances. The usual dose varies according to the utilized product, the treated patient, the concerned complaint and the selected administration route; it may be for instance from 10 mg to 200 mg per day, by oral route in human beings.

As medicines, new tricyclic amino compounds of general formula (1) according to the invention may be employed either in the form of bases or in the form of pharmaceutically acceptable acid addition salts. Preference is given among the acid addition salts to those obtained with the following acids: hydrochloric, hydrobromic, hydroiodic, nitric, sulfuric, phosphoric, acetic, maleic, fumaric, succinic, tartaric, citric, benzoic, alkane sulfonics, cyclohexyl sulfamic and arene sulfonics.

The present invention concerns also pharmaceutical compositions which comprise as active principles one at least of the compounds of the general formula (1) and/or their acid addition salts. These compositions are prepared in order to be administered through digestive or parenteral route. They can be solid or liquid; the pharmaceutical compositions are Those usually employed in human medicine, as for example tablets, coated or not, capsules, solutions, suppositories, parenteral preparations. They are prepared according to usual means. The active principle or principles can be incorporated with excipients which are normally employed in those pharmaceutical compositions, such as for instance, talcum, arabic gum, lactose, starch, magnesium stearate, cocoa butter, aqueous or non aqueous vehicles, various wetting dispersing and emulsifying agents and preservatives.

The following non limiting examples illustrate the invention:

EXAMPLE 1

10,11-Dihydro-5-[3-(dimethylamino)-2-oxo propyl-idene]-5H-dibenzo[a,d]cycloheptene hydrochloride.

A mixture of 32.5 g (0.111 mole) of 10,11-dihydro-5-[3-(dimethylamino)-1-propynyl]-5H-dibenzo[a,d]cyclohepten-5-ol and of 800 ml of 6 N sulfuric acid was boiled, while stirring, at 100° C., during 30 minute. AFter cooling, 1,000 ml of water were added, the reaction mixture was basified with a 40 percent sodium hydroxyde solution. The solution was extracted with ether and the extracts were collected and treated with dry hydrochloric acid. AFter standing for 15 hours at 0°

C., the resulting crystals were collected and recrystallized from a mixture of ethanol and ethyl ether to give 31 g (85 percent) of 10,11-dihydro-5-[3-(dimethylamino)-2-oxo propylidene]-5H-dibenzo[a,d]cycloheptene hydrochloride as creamy crystals. Melting point : 190° – 196° C. on a hot stage microscope.

Analysis: $C_{20} H_{22} Cl N O$

| C | H | N | Cl |
|---|---|---|---|
| Calculated %73.3 | 6.8 | 4.3 | 10.8 |
| Found %73.1 | 6.8 | 4.1 | 10.6 |

EXAMPLE 2

9,10-Dihydro-10,10-dimethyl-9-[3-(dimethylamino)-2-oxo propylidene]anthracene hydrochloride.

Following the procedure described in Example 1, but starting from 6 g (0.0198 mole) of 9,10-dihydro-10,10-dimethyl-9-[3-(dimethylamino)-1-propynyl]-9-anthrol and 140 ml of 6 N sulfuric acid, 4.1 g (61 percent) of 9,10-dihydro-10,10-dimethyl-9-[3-(dimethylamino)-2-oxo propylidene]anthracene hydrochloride were obtained. Melting point : 115° C. on a hot stage microscope.

ANalysis: $C_{21} H_{24} Cl N O$

| C | H | N |
|---|---|---|
| Calculated %73.8 | 7.1 | 4.1 |
| Found %73.9 | 7.2 | 4.1 |

9,10-Dihydro-10,10-dimethyl-9-[3-(dimethylamino)-1-propynyl]-9-anthrol, starting material for the preparation of the above mentioned compound, was obtained as follows : a solution of 32.8 g (0.2 mole) of 2-bromo-N,N-dimethyl allylamine in 20 ml of anhydrous ether was added dropwise to a suspension of sodium amide, prepared from 9.2 g (0.4 at-g) of sodium in 300 ml of liquid ammonia. Ammonia was driven off while introducing 300 ml of toluene into the reaction mixture, and a solution of 22.2 g (0.1 mole) of 10,10-dimethyl anthrone in 100 ml of toluene was added. The mixture was boiled under reflux for 6 hours, while stirring. After cooling, 200 ml of water were added, dropwise. The resulting precipitate was collected, dried and recrystallized from 800 ml of methanol to give 17.8 g (58.5 percent) of 9,10-dihydro-10,10-di-methyl-9-[3-(dimethylamino)-1-propynyl]-9-anthrol. Melting point : 204° – 205° C. on a hot stage microscope.

Analysis : $C_{21} H_{23} N O$

| C | H | N |
|---|---|---|
| Calculated %82.6 | 7.6 | 4.6 |
| Found %82.7 | 7.7 | 4.6 |

EXAMPLE 3

10,11-Dihydro-5-[3-(dimethylamino)-2-hydroxy propylidene]-5H-dibenzo[a,d]cycloheptene hydrochloride.

A solution of 5.8 g (0.02 mole) of 10,11-dihydro-5- [3-(dimethylamino)-2-oxo propylidene]-5H-dibenzo[a,d]cycloheptene in 100 ml of ethanol, containing 1 g of Raney nickel in suspension, was stirred under hydrogen at atmospheric pressure and room temperature. When the theoretical quantity of hydrogen was absorbed, the catalyst was separated by filtration, and the filtrate was treated with dry hydrochloric acid. Ethanol was driven off by concentration in vacuo, and the solid residue was recrystallized from a mixture of acetone and ether to give 5.35 g (81 percent) of 10,11-dihydro-5-[3-(dimethylamino)-2-hydroxy propylidene]-5H-dibenzo[a,d]cycloheptene hydrochloride. Melting point : 206° C. on a hot stage microscope.

Analysis : $C_{20} H_{24} Cl N O$

| C | H | N |
|---|---|---|
| Calculated %72.8 | 7.3 | 4.3 |
| Found %72.6 | 7.5 | 4.3 |

EXAMPLE 4

10,11-Dihydro-5-[3-(dimethylamino)-2-hydroxy propylidene]-5H-dibenzo[a,d]cycloheptene hydrochloride.

Solid sodium borohydride (3.8 g, 0.1 mole) was added in small portions to a stirred solution of 6.6 g (0.02 mole) of 10,11-dihydro-5-[3-(dimethylamino)-2-oxo propylidene]-5H-dibenzo[a,d]cycloheptene hydrochloride in 80 ml of methanol. Stirring was carried on during 1 hour at room temperature, then 1 hour under reflux at boiling temperature. After cooling, 100 ml of water were added, and methanol was driven off in vacuo. The resulting aqueous solution was extracted several times with ether. Ethereal extracts were collected, dried and treated with dry hydrochloric acid. Ether was driven off by concentration, and the residue was recovered in 80 ml of acetone. By adding ether to this solution, there was obtained a precipitate which was recrystallized from a mixture of acetone and ether to give 3 g (50 percent) of 10,11-dihydro-5-[3-di-methylamino)-2-hydroxy propylidene]-5H-dibenzo[a,d]cycloheptene hydrochloride, identical to the compound prepared in Example 3. Melting point : 205° – 206° C. on a hot stage microscope.

EXAMPLE 5

10,11-Dihydro-5-[3-(methylamino)-2-oxo propyli-dene]-5-dibenzo[a,d]cycloheptene hydrochloride.

Following the procedure described in example 1, but using 11.1 g (0.04 mole) of 10,11-dihydro-5-[3-(methylamino)-1-propynyl]-5H-dibenzo[a,d]cycloheptene-5-ol and 290 ml of 6 N sulfuric acid, there were finally obtained, after recrystallization from a mixture of ethanol and ethyl ether, 8.8 g (70 percent) of 10,11dihydro-5-[3-(methylamino)-2-oxo propylidene]-5H-di-benzo[a,d]cycloheptene hydrochloride as creamy white crystals. Melting point : 215° – 217° C. on a hot stage microscope.

Analysis : $C_{19} H_{20} Cl N O$

| C | H | Cl |
|---|---|---|
| Calculated %72.7 | 6.4 | 11.3 |
| Found %72.7 | 6.7 | 11.3 |

EXAMPLE 6

10,11-Dihydro-5-[3-(methylamino)-2-hydroxy propylidene]-5H-dibenzo[a,d]cycloheptene hydrochloride.

Solid sodium borohydride (1.9 g, 0.05 mole) was added in small portions to a stirred suspension of 3.1 g (0.01 mole) of 10,11-dihydro-5-3-(methylamino)-2-oxo propylidene]-5H-dibenzo[a,d]cycloheptene hydrochloride in 40 ml of methanol. The mixture was stirred continuously during 1 hour at room temperature, then during 1 hour under reflux at boiling temperature. After cooling, 50 ml of water were added, methanol was driven off in vacuo. The aqueous solution was extracted several times with ether. Ethereal extracts were collected, dried and treated with dry hydrochloric acid. The resulting precipitate was recrystallized from a mixture of acetone and ether to give 2.4 g (76 percent) of 10,11-dihydro-5-[3-(methylamino)-2hydroxy propylidene]-5H-bibenzo[a,d]cycloheptene hydrochloride as white crystals. Melting point : 171° – 174° C. on a hot stage microscope.

Analysis : $C_{19} H_{22} Cl N O$

| C | H |
|---|---|
| Calculated %72.3 | 7.0 |
| Found %72.0 | 7.0 |

EXAMPLE 7

5-[3-(Dimethylamino)-2-oxo propylidene]-5H-di-benzo[a,d]cycloheptene hydrochloride.

Following the procedure described in Example 1, but using 5.8 g (0.02 mole) of 5-[3-(dimethylamino)-1-propynyl]- 5H-dibenzo[a,d]cycloheptene-5-ol and 145 ml of 6 N sulfuric acid, there were finally obtained, two recrystallization from a mixture of acetone, ethanol and ether, 4.7 g (72 percent) of 5-[3-(dimethylamino)-2-oxo propylidene]-5H-dibenzo[a,d]cycloheptene hydrochloride as creamy crystals. Melting point : 180° – 183° C. on a hot stage microscope.

Analysis : $C_{20} H_{20} Cl N O$

| C | H | Cl |
|---|---|---|
| Calculated %73.7 | 6.2 | 10.9 |
| Found %73.3 | 6.6 | 10.2 |

5-[3-(Dimethylamino)-1-propynyl]-5H-dibenzo[a,d]cycloheptene-5-ol, starting material for the preparation of the above mentioned compound, was obtained as follows : 29.9 g (0.25 mole) of 2-chloro-N,N-dimethyl allylamine were added dropwise to a suspension of sodium amide prepared from 11.5 g (0.5 at-g) of sodium in 500 ml of liquid ammonia. The reaction mixture was stirred during 1 hour, and a solution of 50 g (0.242 mole) of 5H-dibenzo[a,d]cycloheptene-5-one in 200 ml of anhydrous xylene was introduced dropwise. Stirring was prosecuted until the whole excess of ammonia was removed, and 200 ml of water were added dropwise. The resulting precipitate was collected and dried to give 36.5 g (52 percent) of 5-[3-(dimethyl-amino)-1-propynyl]-5H-dibenzo[a,d]cycloheptene-5-ol as white crystals. Melting point : 176° – 178° C. on a hot stage microscope after recrystallization from a mixture of benzene and petrol ether.

Analysis: $C_{20} H_{19} N O$

| C | H | N |
|---|---|---|
| Calculated %83.0 | 6.6 | 4.8 |
| Found %83.3 | 6.7 | 4.9 |

EXAMPLE 8

Tablets were prepared which corresponded to the formula :

| | |
|---|---|
| 10,11-Dihydro-5-[3-(dimethylamino)-2-oxo propylidene]-5H-dibenzo[a,d]cycloheptene hydrochloride | 20 mg |
| Excipient s.q. for 1 tablet | 200 mg |
| (Excipient : lactose, starch, talcum, magnesium stearate). | |

EXAMPLE 9

Tablets were prepared which corresponded to the formula :

| | |
|---|---|
| 9,10-Dihydro-10,10-dimethyl-9-[3-(dimethylamino)-2-oxo propylidene]anthracene hydrochloride | 20 mg |
| Excipient s.q. for 1 tablet | 200 mg |
| (Excipient: lactose, starch, talcum, magnesium stearate). | |

EXAMPLE 10

Tablets were prepared which corresponded to the formula:

10,11-Dihydro-5-[3-(dimethylamino)-2-

| | |
|---|---|
| hydroxy propylidene]-5H-dibenzo[a,d]cycloheptene hydrochloride | 20 mg |
| Excipient s.q. for 1 tablet | 200 mg |
| (Excipient : lactose, starch, talcum magnesium stearate). | |

EXAMPLE 11

Tablets were prepared which corresponded to the formula:

| | |
|---|---|
| 5[3-(Dimethylamino)-2-oxo propylidene]-5H-dibenzo[a,d]cycloheptene hydrochloride | 20 mg |
| Excipient s.q. for 1 tablet | 200 mg |
| (Excipient: lactose, starch talcum, magnesium, stearate). | |

EXAMPLE 12

A parenteral preparation was prepared which corresponded to the formula:

| | |
|---|---|
| 10,11-Dihydro-5-[3-(dimethylamino)-2-oxo propylidene]-5H-dibenzo[a,d]cycloheptene hydrochloride | 20 mg |
| Aqueous solvent | 2 ml |

We claim:

1. A compound selected from the group consisting of tricyclic amino compounds and acid addition salts thereof, said tricyclic amino compounds having the general formula :

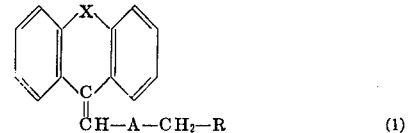

(1)

in which X is a divalent hydrocarbon radical selected from the group consisting of the following divalent hydrocarbon radicals :

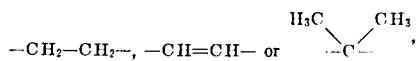

A is a member selected from the group consisting of carbonyl (CO) and hydroxymethylene (CHOH) radicals and R is a member selected from the group consisting of monoalkylamino and dialkylamino radicals.

2. A compound selected from the group consisting of 10,11-dihydro-5-[3-(dimethylamino)-2-oxo propylidene]-5H-dibenzo [a,d] cycloheptene and acid addition salts thereof.

3. A compound selected from the group consisting of 9,10-dihydro-10,10-dimethyl-9-[3-(dimethylamino)-2-oxo propylidene] anthracene and acid addition salts thereof.

4. A compound selected from the group consisting of 10,11-dihydro-5-[3-(dimethylamino)-2-hydroxy propylidene]-5H-dibenzo [a,d]cycloheptene and acid addition salts thereof.

5. A compound selected from the group consisting of 5-[3-(dimethylamino)-2-oxo propylidene]-5H-dibenzo [a,d]cycloheptene and acid addition salts thereof.

* * * * *